Oct. 31, 1967   R. SOLISCH ETAL   3,350,157
HIGH-SPEED CAMERA OBJECTIVE
Filed March 30, 1964
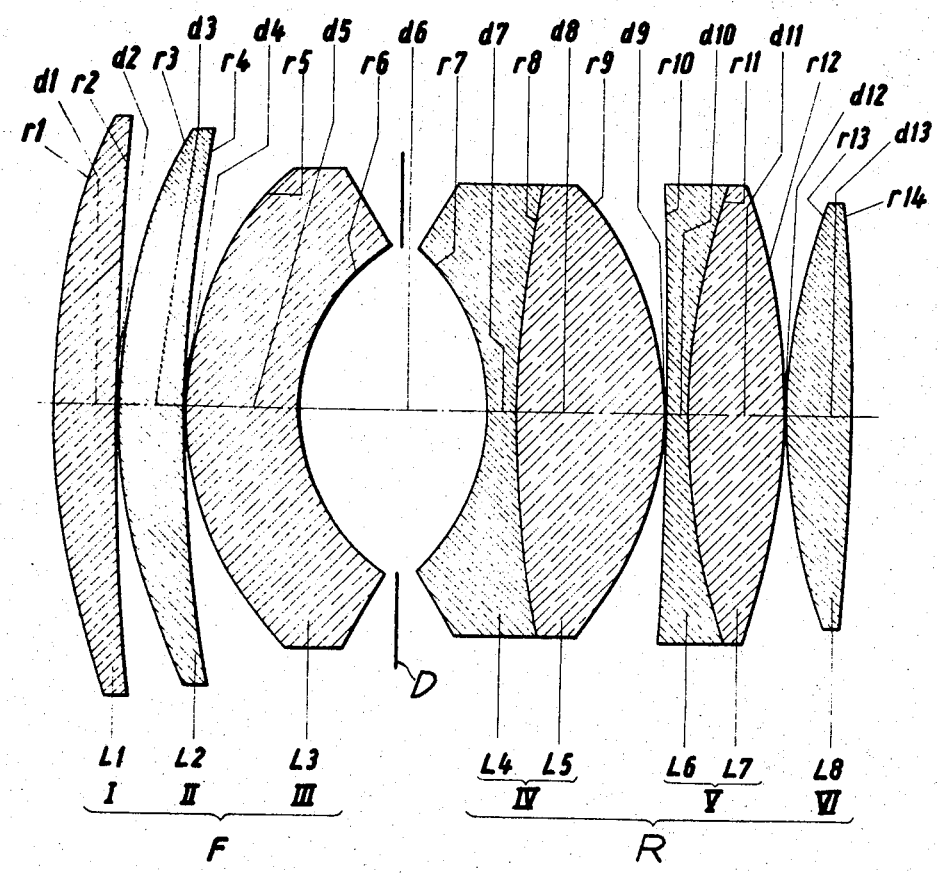
RUDOLF SOLISCH
WALTER WÖLTCHE
Inventors.
BY Karl G. Ross
AGENT United States Patent Office 3,350,157
Patented Oct. 31, 1967

3,350,157
HIGH-SPEED CAMERA OBJECTIVE
Rudolf Solisch and Walter Woltche, Bad Kreuznach, Germany, assignors to Jos. Schneider & Co. Optische Werke, Bad Kreuznach, Germany, a corporation of Germany
Filed Mar. 30, 1964, Ser. No. 355,829
Claims priority, application Germany, Apr. 20, 1963, Sch 33,148
1 Claim. (Cl. 350—210)

ABSTRACT OF THE DISCLOSURE

High-speed camera objective with a front and a rear component of three lens members each, defining a diaphragm spaced between them, the first two members of the rear component being doublets with forwardly convex cemented surfaces of, respectively, negative and positive refractivity.

---

Our present invention relates to a high-speed objective for photographic or cinematographic cameras, more particularly an objective whose back-focal length equals or exceeds half its overall focal length.

Known camera objectives of this type, designed for the extremely high aperture ratio of about 1:1, suffer from a markedly decreased luminosity at the corners of the image field. It is, therefore, an object of our invention to provide an objective of this type, having the large aperture ratio referred to, whose luminosity at the corners is related to that at the center by a ratio equaling or preferably exceeding 1:2.

A related object of our invention is to provide an objective of this description of high resolving power adapted to be used for specific purposes, such as television, requiring high-contrast reproduction.

The foregoing objects are realized, in conformity with this invention, by the provision of an objective composed of six lens members of which the first, second, fifth and sixth (counting from front to rear, i.e. from the object side to the image side of the system) are positively refracting whereas the third and fourth members are negatively refracting and are constituted by a pair of menisci facing each other with their concave sides across a relatively large air space, generally utilized as a diaphragm space; the fourth lens member, i.e. the more rearwardly positioned one of the two negative menisci, and the positive fifth member immediately following that meniscus are doublets, each composed of two lenses of opposite refractivity, the collective lens forming part of the fourth member having an axial thickness which is at least equal to and preferably in excess of 12% of the overall focal length of the objective.

According to a more specific feature, the collective lenses of the two doublets are biconvex and are disposed rearwardly of the associated collective lenses, the cemented surface separating the two lenses of each doublet being negatively refracting in the case of the fourth member and positively refracting in the case of the fifth member.

According to a further feature of the invention, the positive sixth member (whose rear surface facing the image side may be convex, plane or concave) has a convex front surface whose radius of curvature has an absolute value at most equal to and preferably less than one-third that of the radius of curvature of the advantageously concave front surface of the positive fifth member.

We have found that an objective of this construction can be designed with an aperture ratio as high as 1:0.95 and with a luminosity ratio along the image diagonal of about 1:1.3, the bundle of slanting incident rays at maximum image angle being thus unusually large; at the same time the maximum spherical zonal aberration was found to amount to less than 0.2% of the overall focal length upon a zero correction of the marginal ray.

We further determined that the desired large back-focal length, which may be in excess of 60% of the overall focal length, can be realized if the axial thicknesses and separations of all the lens members are so selected that the total length of the assembly, while exceeding the overall focal length, is not greater than substantially 1.8 times that focal length. At the same time, the axial length of the front component, which consists of the first three members, should be less than the axial length of the rear component, constituted by the last three members, the intervening air space extending axially over at least 25% of the overall focal length.

For the purpose of expanding the astigmatic image shells and lengthening the lower coma rays, we have discovered that the refractive indices of the glasses of the negative third member, the collective component of the cemented fifth member and the sixth member should be greater than 1.62.

A typical embodiment of our invention is shown in the sole figure of the accompanying drawing.

The objective shown in the figure consists of a front component F and a rear component R. Component F is constituted by a front member I in the form of a positive meniscus $L_1$, a second member II represented by a similarly shaped lens $L_2$ and a third member III in the form of a meniscus $L_3$ with a rearwardly facing concave side. The lenses $L_1$–$L_3$, all singlets, have radii of curvature $r_1$ to $r_6$ and axial thicknesses $d_1$, $d_3$ and $d_5$, their separations from one another being designated $d_2$ and $d_4$. A large air space $d_6$, accommodating a diaphragm D, separates component F from component R whose first member IV is a negative doublet composed of a biconcave dispersive lens $L_4$ (radii $r_7$, $r_8$ and thickness $d_7$) and a biconvex collective lens $L_5$ (radii $r_8$, $r_9$ and thickness $d_8$). As the refractive index of lens $L_4$ exceeds that of lens $L_5$, the forwardly convex cemented surface $r_8$ is negatively refracting. Member IV is separated by a small air space $d_9$ from a meniscus-shaped positive doublet V also composed of a biconcave dispersive lens $L_6$ (radii $r_{10}$, $r_{11}$ and thickness $d_{10}$) and a biconvex collective lens $L_7$ (radii $r_{11}$, $r_{12}$ and thickness $d_{11}$); the forwardly convex cemented surface $r_{11}$ is positively refracting as the refractive index of lens $L_7$ exceeds that of lens $L_6$. The rear member VI, separated from member V by a small air space $d_{12}$, is again a positive singlet (here biconvex) with radii $r_{13}$, $r_{14}$ and thickness $d_{13}$.

Representative values of the parameters $r_1$ to $r_{14}$ and $d_1$ to $d_{13}$ of the illustrated objective, based on an overall focal length of 100 units (e.g. millimeters), along with their refractive indices $n_d$ for the yellow sodium line and their Abbé numbers $\nu$ are given in the following table; this system has a relative aperture of 1:0.95 and a back-focal length of 60.58.

| | Lens | Radii | Thicknesses and Separations | $n_d$ | $\nu$ |
|---|---|---|---|---|---|
| F | I — L₁ | $r_1 = +146.36$ | $d_1 = 12.18$ | 1.6200 | 60.3 |
| | | $r_2 = +600.13$ | $d_2 = 0.41$ | Air space | |
| | II — L₂ | $r_3 = +106.73$ | $d_3 = 12.18$ | 1.6200 | 60.3 |
| | | $r_4 = +263.48$ | $d_4 = 0.41$ | Air space | |
| | III — L₃ | $r_5 = + 62.10$ | $d_5 = 21.11$ | 1.7410 | 28.1 |
| | | $r_6 = + 36.36$ | $d_6 = 35.53$ | Air Space (Diaphr.) | |
| R | IV — L₄, L₅ | $r_7 = - 41.54$ | $d_7 = 5.08$ | 1.7410 | 28.1 |
| | | $r_8 = +203.10$ | $d_8 = 28.42$ | 1.7200 | 50.3 |
| | | $r_9 = - 61.98$ | $d_9 = 0.41$ | Air space | |
| | V — L₆, L₇ | $r_{10} = -915.62$ | $d_{10} = 4.11$ | 1.5960 | 39.2 |
| | | $r_{11} = +132.13$ | $d_{11} = 18.27$ | 1.6910 | 54.8 |
| | | $r_{12} = -132.13$ | $d_{12} = 0.41$ | Air space | |
| | VI — L₈ | $r_{13} = +116.00$ | $d_{13} = 12.18$ | 1.6910 | 54.8 |
| | | $r_{14} = -406.86$ | $d_{\text{total}} = 150.70$ | | |

The thickness $d_8$ of biconvex lens $L_5$, equaling 18.27 in the foregoing table, will be seen to exceed 12% of the overall focal length. The front radius $r_{13}$ of member VI, equaling +116, has an absolute value less than ⅓ that of front radius $r_{10}$ of member V, which is given as −915.62. The total axial length of the front component F, measured from the left-hand vertex of lens $L_1$ to the right-hand vertex of lens $L_3$, amounts to 46.29 and is thus less than the total axial length of the rear component R, measured from the left-hand vertex of lens $L_4$ to the right-hand vertex of lens $L_8$, which amounts to 68.88; the intervening space $d_8$, measuring 28.42 units, exceeds 25% of the overall focal length. Finally, the axial length $d_{\text{total}}$ of the entire assembly, of numerical value 150.7, lies between 1 and 1.8 times the focal length.

Although only the lens members IV and V have been shown as doublets, in conformity with a major feature of our invention, it will be apparent that some or all of the remaining members could also be provided with cemented surfaces for purposes of further correction of residual aberrations.

We claim:

A high-speed camera objective composed of six lens members following one another and comprising, in order from the object side to the image side of the objective, a positive first member consisting of a first lens $L_1$, a positive second member consisting of a second lens $L_2$, a negative third member consisting of a third lens $L_3$, a negative fourth member composed of a fourth and a fifth lens $L_4$, $L_5$, a positive fifth member composed of a sixth and a seventh lens $L_6$, $L_7$, and a positive sixth member consisting of an eighth lens $L_8$, said lenses having radii of curvature $r_1$ to $r_{14}$ and thicknesses and separations $d_1$ to $d_{13}$ whose numerical values, based upon a numerical value of 100 for said overall focal length, together with their refractive indices $n_d$ and Abbé numbers are substantially as given in the following table:

References Cited

UNITED STATES PATENTS 2,828,671  4/1958  Murakami _____ 350—215
2,979,988  4/1961  Aklin _____ 350—217

JEWELL H. PEDERSEN, *Primary Examiner.*

R. J. STERN, *Assistant Examiner.*